(No Model.) 3 Sheets—Sheet 1.
L. M. CAMPI.
SWING.
No. 340,977. Patented May 4, 1886.
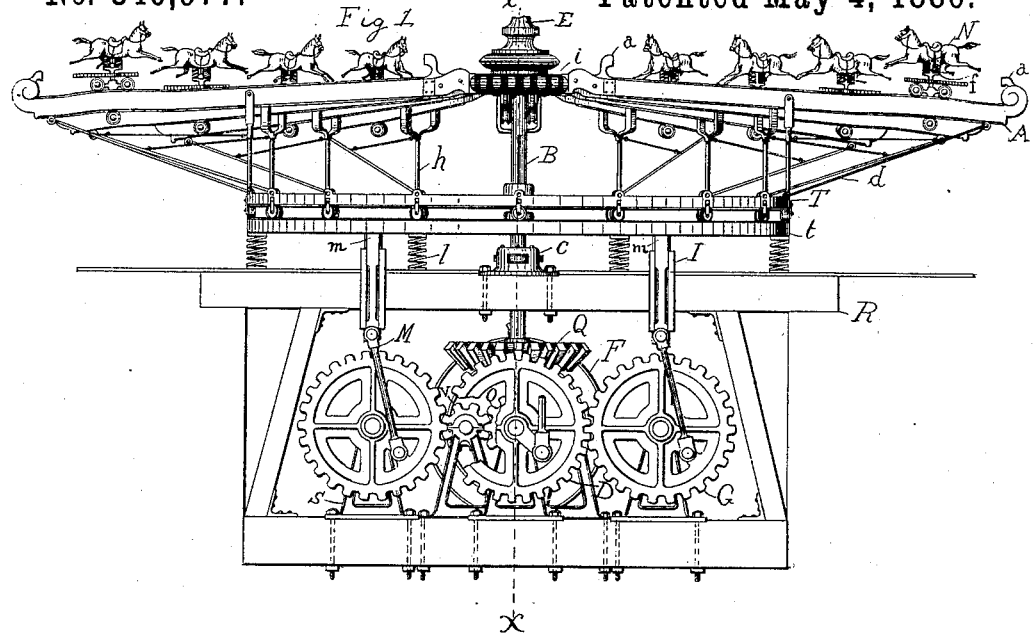
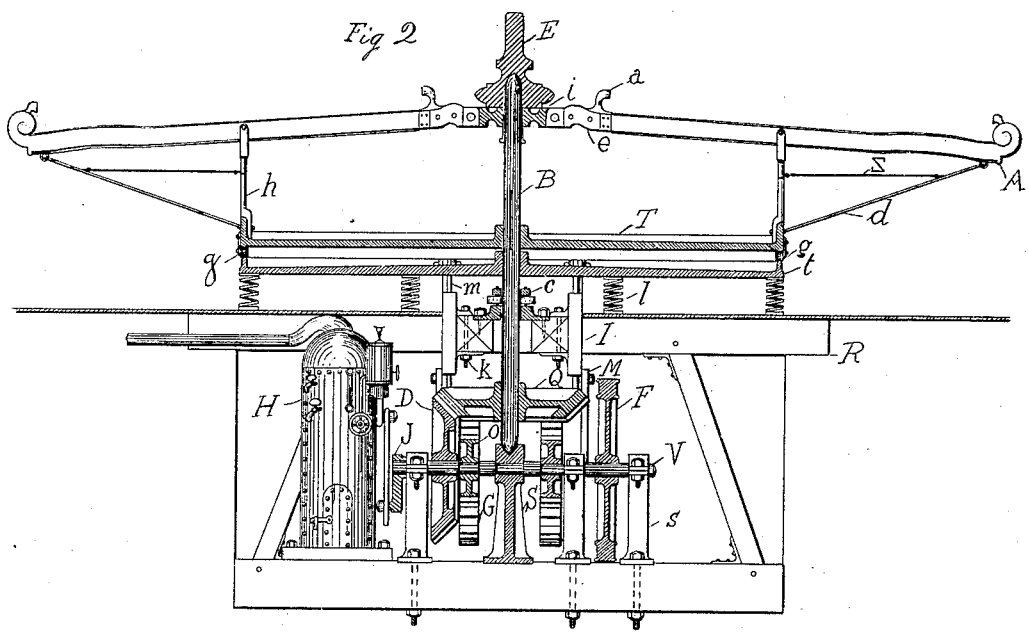
WITNESSES:
Charles C. Bulkley
Abr. M...
INVENTOR
Lucas M. Campi
BY J. R. Martinez Heriz
ATTORNEY
N. PETERS. Photo-Lithographer, Washington, D. C.

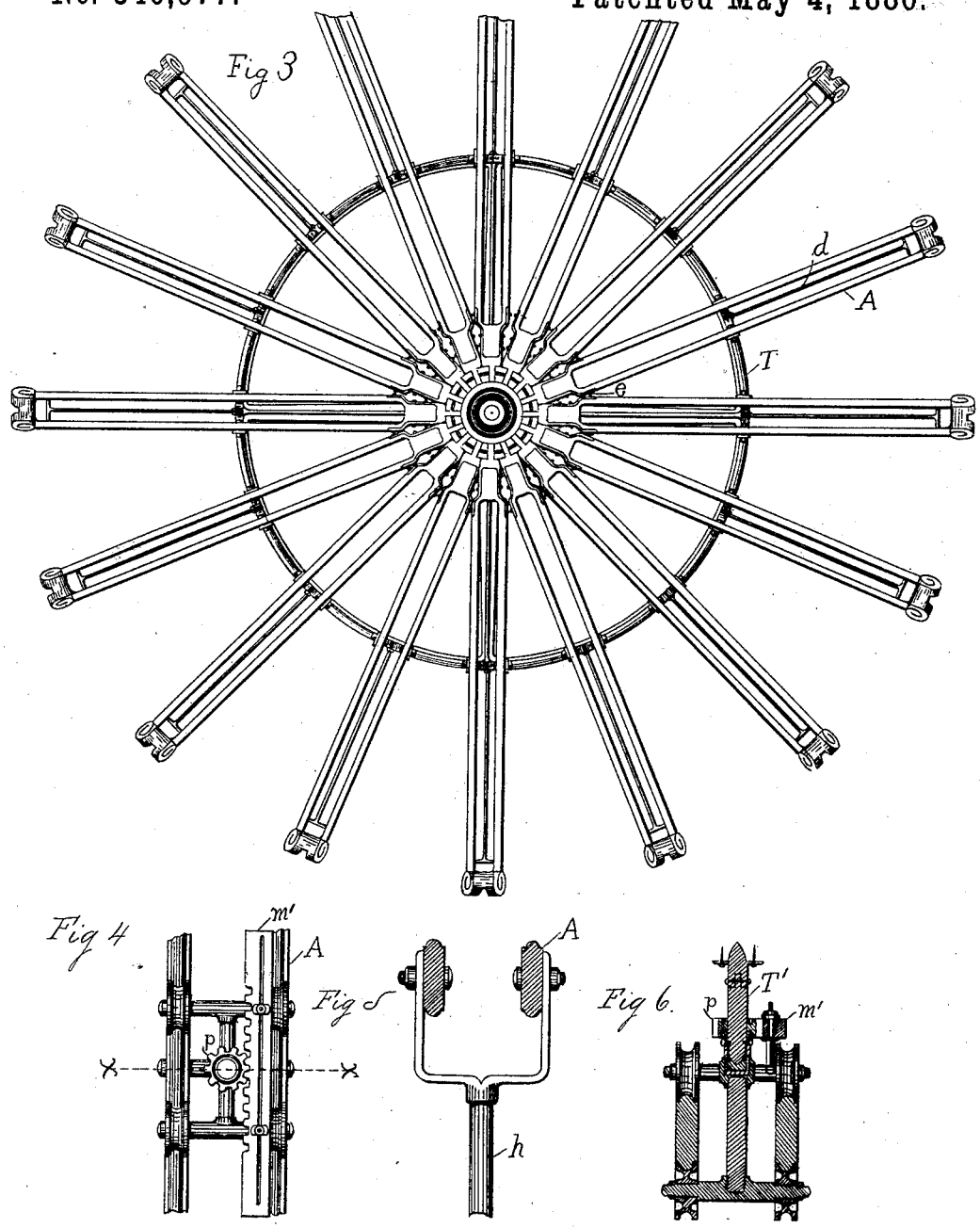

(No Model.)  
L. M. CAMPI.  
SWING.  
No. 340,977. Patented May 4, 1886.

3 Sheets—Sheet 3.

WITNESSES:  
INVENTOR

UNITED STATES PATENT OFFICE.

LUCAS M. CAMPI, OF NEW YORK, N. Y.

SWING.

SPECIFICATION forming part of Letters Patent No. 340,977, dated May 4, 1886.

Application filed September 18, 1885. Serial No. 177,497. (No model.)

*To all whom it may concern:*

Be it known that I, LUCAS M. CAMPI, a citizen of Porto Rico, West Indies, residing in the city, county, and State of New York, have invented a new and useful Improvement in Swings, of which the following is a specification.

My invention relates to that class of swings which are provided with figures or seats caused to rotate in a circular path relatively to a central actuating-shaft, familiarly known as "Merry-Go-Rounds;" and it consists, primarily, in mechanism by means of which said circular movement is imparted to the figures, which, in addition thereto, are caused to travel from one extreme end of their radial arms or tracks to the other, being automatically stopped and turned upon their pivots, so that the rider faces at all times in a forward direction.
At the same time an undulatory movement is given to the figures, imitating the gallop of a horse.

My invention consists, further, in certain details of construction, hereinafter described.
A central vertical shaft is provided to which are secured radial arms or tracks of any desired number, which are so formed as to constitute ways or tracks upon which the wheels of the truck carrying the figures are caused to travel. Secured to cogged wheels which gear with pinion-wheels operated by spur-wheels secured to the main horizontal drive-shaft are crank-pins and connecting-rods, which latter are secured or pivoted to blocks or rods secured to a circular ring-plate. Guides are provided secured to the frame in which these blocks slide.

Figure 7:
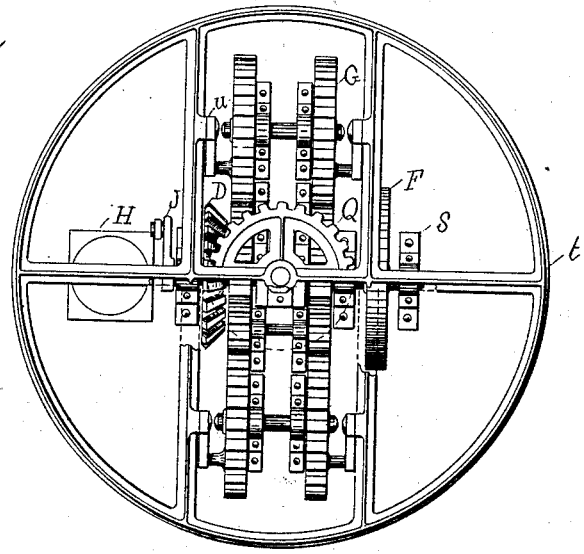
Figure 8:
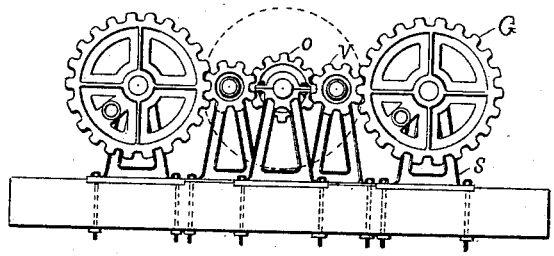

In the accompanying drawings, Figure 1 is a side elevation of my invention, partly broken away. Fig. 2 is a vertical section on the line $xx$, Fig. 1. Fig. 3 is a plan view of the radial arms or tracks. Fig. 4 is a detail view of the truck which supports the figures. Fig. 5 is a transverse section of the radial arm or track and bifurcated supporting rod. Fig. 6 is a transverse section of the radial arm or track and truck supporting the figures. Fig. 7 is a plan of the operating-gear mechanism. Fig. 8 is a side elevation of the same.
In Fig. 2, at H, is shown the prime mover, the connecting-rod of which is pivoted to the crank J, by means of which motion is imparted to the spur horizontal shaft V, which latter is supported by the pedestals $s$ $s$. Said shaft V is provided with a balance or fly wheel, F.

Mounted and bearing upon the pedestal-support S, which also constitutes a bearing for the shaft V, is the vertical shaft B, provided with radial arms or tracks A, attached in a manner hereinafter described. Rigidly attached to the lower end of said shaft B is a horizontal bevel gear-wheel, Q, the teeth of which mesh with those of the vertical gear-wheel D, which latter is secured to the shaft V.

The radial arms or tracks A are secured to the clips or castings $e$, which in turn are pivoted within the slots of the castings $i$, which latter are rigidly secured to the shaft B.

E is an ornamental cap-piece.

The carriage T consists of a circular ring provided with anti-friction wheels $g$, which travel upon a circular track, $t$, secured rigidly to the base-beam R of the frame. The said circular ring is connected by means of spokes to a hub keyed to the shaft B, the keys moving in a slot in said shaft B.

The operation of the device is as follows: By means of the prime mover motion is imparted to the shaft V, on which is mounted the bevel gear-wheel D, which imparts its motion to the gear-wheel Q, thus revolving the shaft B, which in turn imparts a movement of rotation to the radial arms or tracks, carrying the figures N in a circular path. The carriage T and its anti-friction wheels $g$ traveling upon the track $t$, at the same time the wheels G being revolved by means of motion imparted to them by the main drive-shaft V through the medium of the intervening gear-wheels $v$ and $o$, cause the connecting-rods M to push and pull vertically upon the rods or blocks $m$, which in turn cause the circular track $t$ to be raised and lowered vertically relatively to the shaft B, at the same time raising and lowering the carriage T, which, by means of the rods $h$, causes the pivoted radial arms or tracks A to assume different inclinations. When the circular track $t$ is drawn downward by the connecting-rods M, the weight of the frame, figures, and riders causes the radial arms or tracks A to assume inclinations sloping toward the outer extremities of the radial arms or tracks A. It will thus be seen that as the said pivoted radial arms or tracks are caused to assume inclinations sloping toward the outer end of said arms and toward the shaft B the truck supporting the figures will be caused to roll in the direction of the inclination of the arms or tracks A. The stroke of the connecting-rods M and the sizes of the gear-wheels are so calculated and constructed that when the figure shall have traveled the length of the radial arms or tracks A in one direction the inclination of said arms A is changed and the figure made to travel in the opposite direction. Whenever the supporting-truck arrives at either of the extremities of the arms or tracks A, the ratchet-bar $m'$, which gears with the pinion $p$, impinges against the stop $a$, causing said bar $m'$ to slide upon its bolt, thus revolving the shaft or bar support T' and its figure, causing the latter to face in the direction of the travel of the truck. Therefore the figures and their riders are revolved in a circular path, and at the same time caused to travel from one extreme end of their arms or tracks A to the other, being automatically reversed at the end of their movement, so as to face at all times in the direction of their travel.

$l$ are springs interposed between the base-beam R and the circular track $t$, and assist in raising said track.

I are the ways or guides for the rods or blocks $m$.

The springs $f$ permit of an undulatory motion being imparted to the figures, imitating the galloping of a horse.

$c$ is a casting in which are mounted anti-friction wheels bearing against the shaft B.

$d$ are bracing-rods secured at one end to the flange of the carriage T, and provided with small anti-friction wheels at their other ends, which bear against the radial arms or tracks A.

Z are bifurcated rods connected at one end to the bifurcated rods $h$ and at the other end to the rods $d$.

$u$ are the wrist-pins, to which are attached the rods $m$, as shown in Fig. 7.

Having thus described my invention, what I claim as new therein, and desire to secure by Letters Patent, is—

1. The combination, with a pivoted arm or track and means for changing its inclination, of a truck mounted thereon, a shaft mounted in said truck, a pinion secured to said shaft, a sliding ratchet-bar gearing with said pinion, and a stop at each end of the arm or track against which said ratchet-bar strikes, as set forth.

2. The combination, with a rotary shaft having radial arms or tracks, each pivoted at one extremity thereto, of vertically-movable supports to which said tracks are pivoted, and trucks mounted upon said arms or tracks, as set forth.

3. The combination, with a rotary shaft having radial arms or tracks each pivoted at one end thereto, of supports to which said arms are pivoted at an intermediate point, a circular carriage upon which said supports bear, a vertically-movable circular track upon which said carriage runs, and the trucks mounted upon said arms or tracks, as set forth.

4. In a swing, the combination, with a circular track and a carriage mounted thereon, of a rotary shaft by which said carriage is rotated, springs supporting said track, wheels having wrist-pins and pitmen connecting said wrist-pins, and the circular track, for the purpose set forth.

5. The combination of the vertical shaft B, radial arms A, and the figures N, mounted upon trucks traveling on the radial arms or tracks A.

In witness whereof I have hereunto set my hand this 30th day of July, A. D. 1885.

LUCAS M. CAMPI.

Witnesses:
CHARLES C. BUCKLEY,
J. R. MARTINEZ HEMZ.